US010511596B2

(12) United States Patent
Revell

(10) Patent No.: US 10,511,596 B2
(45) Date of Patent: Dec. 17, 2019

(54) MUTUAL AUTHENTICATION

(71) Applicant: KELISEC AB, Bromma (SE)

(72) Inventor: Elise Revell, Rånäs (SE)

(73) Assignee: KELISEC AB, Bromma (SE)

( * ) Notice: Subject to any disclaimer, the term of this patent is extended or adjusted under 35 U.S.C. 154(b) by 211 days.

(21) Appl. No.: 15/516,942

(22) PCT Filed: Oct. 8, 2015

(86) PCT No.: PCT/SE2015/051067
§ 371 (c)(1),
(2) Date: Apr. 5, 2017

(87) PCT Pub. No.: WO2016/056988
PCT Pub. Date: Apr. 14, 2016

(65) Prior Publication Data
US 2018/0063131 A1    Mar. 1, 2018

(30) Foreign Application Priority Data
Oct. 9, 2014    (SE) ...................... 1451211

(51) Int. Cl.
*H04L 29/06*    (2006.01)
*H04L 9/08*    (2006.01)
*H04L 9/32*    (2006.01)

(52) U.S. Cl.
CPC ........ *H04L 63/0869* (2013.01); *H04L 9/0838* (2013.01); *H04L 9/3213* (2013.01);
(Continued)

(58) Field of Classification Search
CPC .............. H04L 63/062; H04L 63/0869; H04L 63/0807; H04L 9/32; H04L 9/3212; H04L 9/3215; H04L 9/3273
See application file for complete search history.

(56) References Cited

U.S. PATENT DOCUMENTS 4,578,531 A    3/1986    Everhart et al.
6,125,186 A    9/2000    Saito et al.
(Continued)

FOREIGN PATENT DOCUMENTS

CN    101112038 A    1/2008
CN    101267301 A    9/2008
(Continued)

OTHER PUBLICATIONS

Int'l Search Report and Written Opinion for PCT/SE2015/051065, dated Dec. 17, 2015.
(Continued)

*Primary Examiner* — Linglan E Edwards
(74) *Attorney, Agent, or Firm* — Merchant & Gould P.C.

(57) ABSTRACT

A first terminal and a server, wherein the first terminal is configured to authenticate the server by: generating a first authentication token, being a data structure to be used for authenticating a first computing device to a second computing device; and sending the first authentication token to the server, wherein the server is configured for receiving the first authentication token and authenticate it; generating a second authentication token for the first terminal; and send the second authentication token to the first terminal, whereby the first terminal is configured for receiving the second authentication token and authenticate it, thereby performing a mutual authentication of the first terminal and the server.

7 Claims, 11 Drawing Sheets

(52) U.S. Cl.
CPC .......... *H04L 9/3215* (2013.01); *H04L 9/3273* (2013.01); *H04L 63/062* (2013.01); *H04L 63/0807* (2013.01)

(56) References Cited

U.S. PATENT DOCUMENTS

| | | | |
|---|---|---|---|
| 7,043,633 B1 | 5/2006 | Fink et al. | |
| 7,149,308 B1 | 12/2006 | Fruehauf et al. | |
| 7,424,115 B2 | 9/2008 | Hyyppa et al. | |
| 7,587,368 B2 | 9/2009 | Felsher | |
| 7,630,940 B2 * | 12/2009 | Watanabe | G06F 21/10 705/52 |
| 7,676,676 B2 * | 3/2010 | Braskich | H04L 63/062 713/169 |
| 7,805,377 B2 | 9/2010 | Felsher | |
| 7,979,707 B2 | 7/2011 | Rostin et al. | |
| 8,086,853 B2 * | 12/2011 | Warwick | H04L 9/321 710/15 |
| 8,433,066 B2 | 4/2013 | Revell | |
| 8,498,941 B2 | 7/2013 | Felsher | |
| 8,527,764 B2 * | 9/2013 | Kiran | H04N 21/26613 713/156 |
| 8,738,898 B2 * | 5/2014 | Herwono | H04L 9/0822 713/155 |
| 8,745,715 B2 * | 6/2014 | Lindholm | H04L 63/083 713/169 |
| 8,990,554 B2 * | 3/2015 | King | H04L 63/062 713/155 |
| 2002/0159598 A1 | 10/2002 | Rubinstein et al. | |
| 2003/0039358 A1 | 2/2003 | Scheidt et al. | |
| 2003/0145203 A1 | 7/2003 | Audebert et al. | |
| 2005/0125668 A1 | 6/2005 | Botz | |
| 2006/0064588 A1 | 3/2006 | Tidwell et al. | |
| 2006/0212701 A1 * | 9/2006 | Warwick | H04L 9/321 713/168 |
| 2006/0285694 A1 | 12/2006 | Kim et al. | |
| 2007/0186099 A1 | 8/2007 | Beck et al. | |
| 2007/0201702 A1 | 8/2007 | Hendricks et al. | |
| 2008/0147820 A1 | 6/2008 | Maeda et al. | |
| 2008/0235513 A1 | 9/2008 | Foster et al. | |
| 2009/0177894 A1 | 7/2009 | Orsini et al. | |
| 2009/0235339 A1 | 9/2009 | Mennes et al. | |
| 2009/0296924 A1 | 12/2009 | Oksman et al. | |
| 2010/0161817 A1 | 6/2010 | Xiao et al. | |
| 2010/0191830 A1 * | 7/2010 | Kim | G06F 21/445 709/219 |
| 2010/0254533 A1 | 10/2010 | McCullough et al. | |
| 2010/0312810 A1 | 12/2010 | Horton et al. | |
| 2010/0318802 A1 * | 12/2010 | Balakrishnan | G06F 21/445 713/172 |
| 2011/0173684 A1 | 7/2011 | Hurry et al. | |
| 2011/0246770 A1 | 10/2011 | Badra et al. | |
| 2011/0264913 A1 | 10/2011 | Nikander et al. | |
| 2012/0066517 A1 | 3/2012 | Vysogorets et al. | |
| 2012/0066757 A1 | 3/2012 | Vysogorets et al. | |
| 2012/0072723 A1 | 3/2012 | Orsini et al. | |
| 2012/0087495 A1 | 4/2012 | Revell | |
| 2012/0200386 A1 | 8/2012 | Robshaw et al. | |
| 2012/0265976 A1 | 10/2012 | Spiers et al. | |
| 2013/0007434 A1 | 1/2013 | King et al. | |
| 2013/0145172 A1 | 6/2013 | Shablygin et al. | |
| 2013/0208893 A1 | 8/2013 | Shablygin et al. | |
| 2013/0219481 A1 | 8/2013 | Voltz | |
| 2014/0047237 A1 | 2/2014 | Parrish | |
| 2014/0141763 A1 | 5/2014 | Suh et al. | |
| 2014/0149742 A1 | 5/2014 | Yau | |
| 2014/0215215 A1 | 7/2014 | Tanaka | |
| 2014/0229731 A1 | 8/2014 | O'Hare et al. | |
| 2015/0052063 A1 | 2/2015 | Feraud | |
| 2015/0134960 A1 | 5/2015 | Garcia Morchon et al. | |
| 2016/0043866 A1 | 2/2016 | Nixon et al. | |
| 2017/0078275 A1 * | 3/2017 | Slovetskiy | H04L 63/0807 |
| 2017/0257352 A1 | 9/2017 | Revell | |
| 2017/0293768 A1 | 10/2017 | Revell | |
| 2017/0295016 A1 | 10/2017 | Revell | |
| 2017/0310665 A1 | 10/2017 | Revell | |
| 2018/0054427 A1 | 2/2018 | Revell | |

FOREIGN PATENT DOCUMENTS

| | | |
|---|---|---|
| CN | 101897166 A | 11/2010 |
| CN | 103096307 A | 5/2013 |
| CN | 103795545 A | 5/2014 |
| EP | 1443795 A1 | 8/2004 |
| EP | 2663051 A1 | 11/2013 |
| WO | 83/04461 A1 | 12/1983 |
| WO | 02/05061 A2 | 1/2002 |
| WO | 02/39660 A2 | 5/2002 |
| WO | 03/009513 A2 | 1/2003 |
| WO | 2005/008950 A1 | 1/2005 |
| WO | 2009/060283 A1 | 5/2009 |
| WO | 2009/081418 A1 | 7/2009 |
| WO | 2011/002412 A1 | 1/2011 |
| WO | 2011/128183 A2 | 10/2011 |
| WO | 2013/079848 A1 | 6/2013 |
| WO | 2013/175324 A1 | 11/2013 |

OTHER PUBLICATIONS

Int'l Search Report for PCT/SE2015/051066, dated Feb. 1, 2016.
Written Opinion for PCT/SE2015/051066, dated Sep. 28, 2016.
Int'l Search Report and Written Opinion for PCT/SE2015/051068, dated Jan. 29, 2016.
Int'l Search Report and Written Opinion for PCT/SE2015/051069, dated Dec. 1, 2015.
Aleksander et al.,"A Generation Method of Cryptographic Keys for Enterprise Communication Systems", 2013 International Conference on Availability, Reliability and Security:406-411 (2013).
Int'l Search Report and Written Opinion for PCT/SE2015/050940, dated Jan. 18, 2016 (corrected).
Int'l Preliminary Report on Patentability for PCT/SE2015/050940, dated Jan. 17, 2017.
Search Report for European Pat. Appln. No. 15849138.1, dated May 14, 2018.
Search Report for European Pat. Appln. No. 15849717.2, dated May 3, 2018.
Search Report for European Pat. Appln. No. 15849042.5, dated Apr. 18, 2018.
Search Report for European Pat. Appln. No. 15848179.6, dated May 2, 2018.
Search Report for European Pat. Appln. No. 15849776.8, dated Apr. 25, 2018.
Search Report for European Pat. Appln. No. 15844748.2, dated Apr. 30, 2018.
Tim Dierks Independent Eric Rescorla Network Resonance et al., "The Transport Layer Security (TLS) Protocol Version 1.2; draft-ietf-tls-rfc4346-bis-10.txt", Internet Engineering Task Force, IETF; Standardworkingdraft, Internet Society (ISOC) 4, Rue Des Falaises CH-1205, Geneva, Switzerland, vol. tls, No. 10 (2008).
"Chapter 13: Key Management Techniques ED—Menezes A J; Van Oorschot P C; Vanstone S A", Handbook of Applied Cryptograph; [CRC Press Series on Discrete Mathematics and Its Applications], CRC Press, FL, US:543-590 (1996).
Anonymous, "Mutual Authentication (The Java EE 6 Tutorial)" (2010).
Search Report for European Patent Application No. 15849042.5, dated Apr. 18, 2018.
Int'l Search Report and Written Opinion issued in connection with Int'l Appl'n No. PCT/SE2015/051067 dated Dec. 11, 2015.
Int'l Preliminary Report on Patentability issued in connection with Int'l Appl'n No. PCT/SE2015/051067 dated Jan. 11, 2017.
Oppliger, R., et al., "SSL/TLS Session-Aware User Authentication—Or How to Effectively Thwart the Man-in-the-Middle", In Computer Communications, Elsevier Science Publishers BV, Amsterdam, NL. vol. 29, No. 12. Aug. 4, 2006; pp. 2238-2246.
Byeong-Thaek Oh, et al., "A Peer Mutual Authentication Method using PKI on Super Peer based Peer-to-Peer Systems", Electronics and Telecommunications Research Institute, Feb. 17-20, 2008, pp. 2221-2225.

(56) References Cited

OTHER PUBLICATIONS

Office Action issued in corresponding Chinese Pat. Appln. No. 201580054852.1, dated Sep. 12, 2019.

* cited by examiner

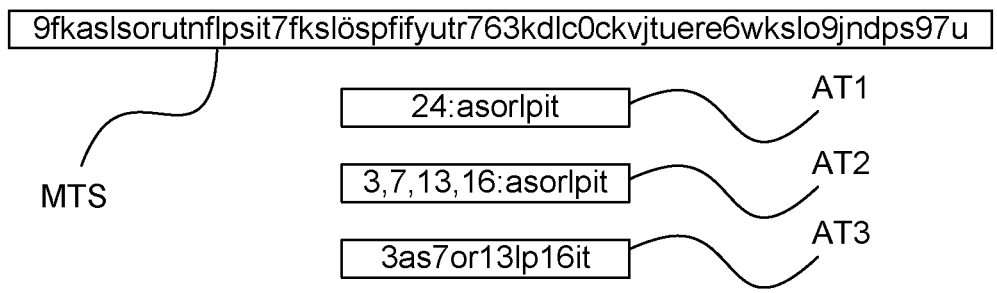
Fig. 9
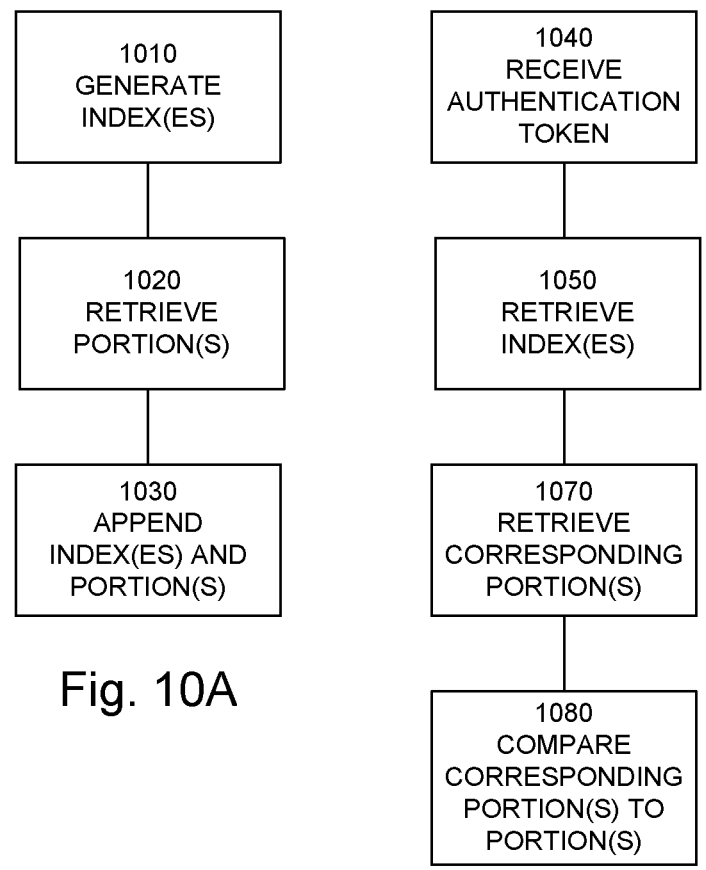
Fig. 10A
Fig. 10B

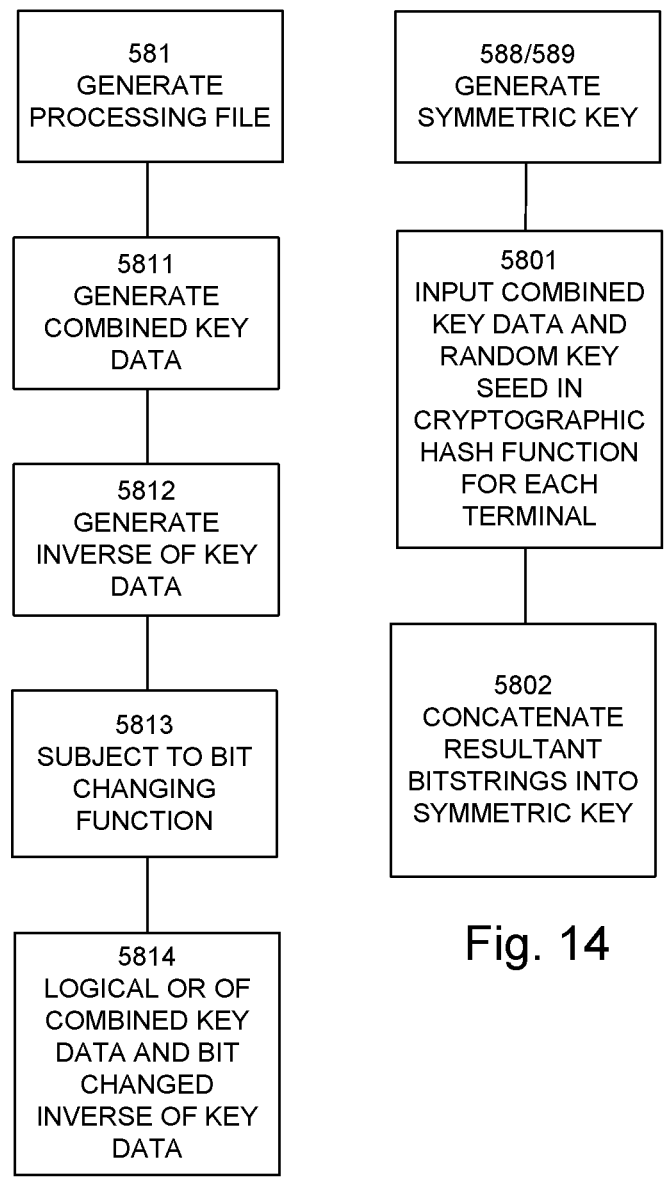

MUTUAL AUTHENTICATION

CO-EXISTING RELATED PATENT APPLICATIONS

This application is filed concurrently with the applications titled as per below and filed by the same applicant. Details on specific issues in the various patent applications are to be considered as incorporated into each one of the other related patent applications.

The related patent applications are titled:
IMPROVED INSTALLATION OF A TERMINAL IN A SECURE SYSTEM;
GENERATING A SYMMETRIC ENCRYPTION KEY;
IMPROVED SECURITY THROUGH AUTHENTICATION TOKENS; and
IMPROVED SYSTEM FOR ESTABLISHING A SECURE COMMUNICATION CHANNEL.

TECHNICAL FIELD

This application relates to a system, a method, an apparatus and a computer-readable storage medium for improved security and safety, and in particular to a system, a method, an apparatus and a computer-readable storage medium for establishing a secure communication channel.

BACKGROUND

In today's society digital communication is ever increasing and most people feel comfortable performing tasks such as managing their bank accounts, declaring their income, or exchanging other secret information using the Internet. In order to perform such tasks while maintaining a satisfactory level of security many different security solutions, based on encryption, have been suggested. Most such solutions involve some type of public key and private key and a user has to share his public key before a secure communication may be established with another party. In cryptography, a key may be seen as a piece of information that determines a functional output of a cryptographic algorithm.

It is often said that in designing security systems, it is wise to assume that the details of a cryptographic algorithm may already be available to an attacker. This principle is known as Kerckhoffs' principle and thus it is only the secrecy of the key that provides security. This principle is based on the fact that it is difficult to keep the details of a widely-used algorithm secret. A key is often easier to protect, since it is often a small piece of information compared to the encryption algorithm. However, it may also be difficult to keep the key a secret. If the attacker obtains the key in some way he or she may recover the original message from the encrypted data.

Encryption algorithms which use the same key for both encryption and decryption are known as symmetric encryption key algorithms. There are also asymmetric encryption key algorithms which use a pair of keys, one to encrypt and one to decrypt. These asymmetric encryption key algorithms allow one key to be made public while retaining the private key in only one location. The asymmetric encryption keys are designed so that finding out the private key is extremely difficult, even if the corresponding public key is known. A user can publish his or her public key, while keeping the private key secret, allowing anyone to send them an encrypted message.

In order for a key to be "safe" in conjunction with symmetric encryption algorithms a length of 80 bits is generally considered the minimum and 128-bit keys are commonly used and considered to be very strong. The keys used in public key cryptography have some mathematical structure. For example, public keys used in the RSA system are the product of two prime numbers. Thus public key systems require longer key lengths than symmetric systems for an equivalent level of security. 3072 bits is the suggested key length for systems based on factoring and integer discrete logarithms which aim to have security equivalent to a 128 bit symmetric cipher.

As mentioned above it is possible to generate keys with a high degree of security, if they are long enough both for keys based on symmetric and asymmetric algorithms. However, there may be a problem in key distribution. If, for example two parties want to communicate with each other using symmetric cryptography they first have to decide what key to use and then safely distribute it from one party to the other. Furthermore, the key has to be kept secret by both parties. The risk that an intruder may find out the key increases with the time the key is in use. Therefore, a key is normally valid only during a limited time, for example six or twelve months. After this time a new key has to be distributed.

Also, the distribution of keys for asymmetric cryptography encryption encounters problems with key distribution when two parties want to communicate with each other. In order to send information in both directions they generally need to exchange public keys with each other. Also in this case the keys usually have a limited time period during which they are valid. For a party that communicates with many different parties the management and distribution of valid public keys may be annoying. A typical example is when the validity of a key has expired when you need to send some secret information urgently to another party or that you have not yet exchanged public keys.

One solution is provided in WO 2011/002412 which discloses a method for generating an encryption/decryption key, and especially for generating a one-time encryption/decryption key used for symmetric encryption, i.e. where the same key is used both for encryption and decryption. In order to start key generation, a first terminal (A) sends a request to a central server (2) for setting up communication with a second terminal (B). The central server (2) sends a key generating file to both terminals (i.e. terminals A and B). Each terminal generates a different intermediate data set, i.e. a first and second data set. The first data set generated by the first terminal (A) is sent to the second terminal (B), which generates, based on this data set, a third data set which is sent back to the first terminal. The generation of a first cryptographic key in terminal (A) is based on a bit by bit comparison between the third and the first intermediate data set and the generation of a second cryptographic key is based on a bit by bit comparison between the first and the second intermediate data set. The first and second cryptographic keys are the same.

Although this manner has many advantages, it may offer challenges when implemented in systems having firewalls or other similar security measures. Given the above mentioned challenges the inventors have realized that there is a need for a method with which it is possible for two parties to communicate in a secure way with each other without necessarily having to exchange keys with each other beforehand and which may be used in systems employing firewalls or other similar security measures.

Accordingly, there is thus a need for improved handling of the encryption keys.

SUMMARY

It is an object of the teachings of this application to overcome the problems listed above by providing a system comprising a first terminal and a server, wherein the first terminal is configured to authenticate the server by: generating a first authentication token, being a data structure to be used for authenticating a first computing device to a second computing device; and sending the first authentication token to the server, wherein the server is configured for receiving the first authentication token and authenticate it; generating a second authentication token for the first terminal; and send the second authentication token to the first terminal, whereby the first terminal is configured for receiving the second authentication token and authenticate it, thereby performing a mutual authentication of the first terminal and the server.

It is also an object of the teachings of this application to overcome the problems listed above by providing a method for use in a system comprising a first terminal and a server, wherein the method is for authenticating the server by: the first terminal generating a first authentication token, being a data structure to be used for authenticating a first computing device to a second computing device; and the first terminal sending the first authentication token to the server; the server receiving the first authentication token and authenticate it; the server generating a second authentication token for the first terminal; and the server sending the second authentication token to the first terminal, the first terminal receiving the second authentication token and authenticating it, thereby performing a mutual authentication of the first terminal and the server.

It is also an object of the teachings of this application to overcome the problems listed above by providing a computer readable storage medium encoded with instructions that, when executed on a processor, performs the method according to above.

The teachings herein find use in systems for ensuring a secure connection, such as banking applications, but also in systems where one device needs to be authenticated to other devices, such as an external memory being connected to a computer.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail with reference to the accompanying drawings in which:

FIG. 9 shows an example of a meta data string and a corresponding authentication token according to an embodiment of the teachings herein;

FIG. 10A shows a general flowchart for generating an authentication token according to the teachings herein;

FIG. 10B shows a general flowchart for authenticating an authentication token according to the teachings herein;

FIG. 13 is a flowchart for a general method according to herein for generating a processing file from the key data for two terminals according to the teachings herein;

FIG. 14 is a flowchart of a manner of generating the symmetric encryption key according to the teachings herein.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
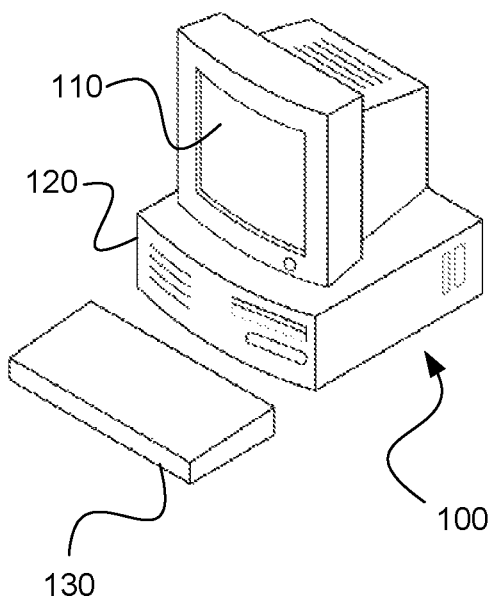
FIG. 1 is a schematic view of a terminal according to the teachings herein.

FIG. 1 shows a communications apparatus 100 according to an embodiment herein. In one embodiment the communication apparatus 100 is configured for network communication, either wireless or wired. In one embodiment the communication apparatus 100 is configured for network communication, both wireless and wired. Examples of such a communication apparatus 100 are: a personal computer, desktop or laptop, an internet tablet, a mobile telephone, a smart phone, a personal digital assistant, a server, electronic key, machine-to-machine device (M2M) and a work station to name a few.

The communication apparatus 100 will hereafter be exemplified and described as being a personal computer 100. The personal computer or terminal 100 comprises a display 110 and a housing 120. The housing comprises a controller or CPU (not shown) and one or more computer-readable storage mediums (not shown), such as storage units and internal memory. Examples of storage units are disk drives or hard drives. The terminal 100 further comprises at least one data port. Data ports can be wired and/or wireless. Examples of data ports are USB (Universal Serial Bus) ports, Ethernet ports or WiFi (according to IEEE standard 802.11) ports. Data ports are configured to enable a terminal 100 to connect with other terminals or a server.

The terminal 100 further comprises at least one input unit such as a keyboard 130. Other examples of input units are computer mouse, touch pads, touch screens or joysticks to name a few.

Figure 2:
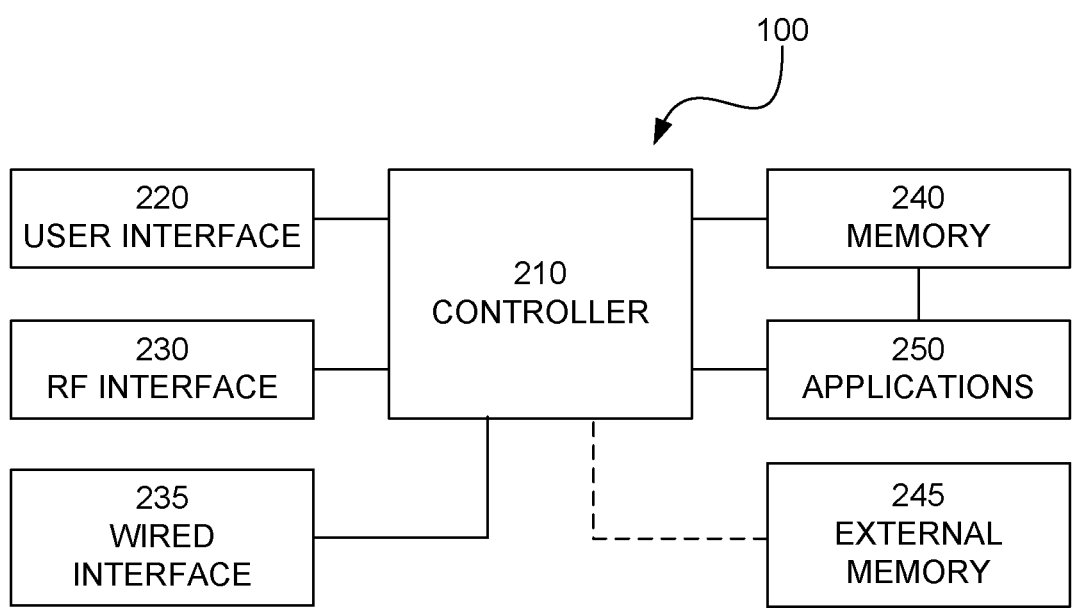
FIG. 2 is a schematic view of the components of a terminal according to the teachings herein.

FIG. 2 shows a schematic view of a general structure of a computing device. The computing device may be a communication apparatus as in FIG. 1 or a server. In one embodiment the computing device is a computing apparatus as will be discussed in further detail below. In the description below the computing device will be disclosed as being a terminal according to FIG. 1. The terminal 100 comprises a controller 210 which is responsible for the overall operation of the terminal 100 and is preferably implemented by any commercially available CPU ("Central Processing Unit"), DSP ("Digital Signal Processor") or any other electronic programmable logic device. The controller 210 may be implemented using instructions that enable hardware functionality, for example, by using executable computer program instructions in a general-purpose or special-purpose processor that may be stored on a computer readable storage medium (disk, memory etc) 240 to be executed by such a processor. The controller 210 is configured to read instructions from the memory 240 and execute these instructions to control the operation of the terminal 100. The memory 240 may be implemented using any commonly known technology for computer-readable memories such as ROM, RAM, SRAM, DRAM, CMOS, FLASH, DDR, EEPROM memory, flash memory, hard drive, optical storage or any combination thereof.

The terminal 100 may also be connected to an external device such as an external memory 245, possibly in the form of a USB stick (Universal Serial Bus) or an external harddrive. Upon connecting such an external device to a terminal, then being an apparatus comprising the terminal and an external terminal or device 245. Any driver update or download that needs to be effected to enable the external device to cooperate with the terminal 100 may be performed by a driver application executed in the controller or by another controller not shown.

The terminal 100 further comprises one or more applications 250. The applications are sets of instructions that when executed by the controller 210 control the operation of the terminal 100. The memory 240 is used for various purposes by the controller 210, one of them being for storing application data and program instructions 250 for various software modules in the terminal 100. The software modules include a real-time operating system, drivers for a manmachine interface 220, an application handler as well as various applications 250. The applications 250 can include a messaging application such as electronic mail, a browsing application, a banking application, as well as various other applications 250.

The terminal 100 may further comprise a user interface 220, which in the terminal 100 of figure of 1, is comprised of the display 110, the keypad 130. The display 110 may be a touch display upon which virtual keys (not shown) may be displayed and operated. Such virtual keys may replace any or all of the physical keys 130 and no difference will be made herein if not explicitly stated.

The user interface (UI) 220 also includes one or more hardware controllers, which together with the UI drivers cooperate with the display 110, keypad 130, as well as various other I/O devices such as sound system, LED indicator, etc. As is commonly known, the user may operate the terminal 100 through the man-machine interface thus formed.

The terminal 100 may further comprise a radio frequency interface 230, which is adapted to allow the terminal to communicate with other devices through a radio frequency band through the use of different radio frequency technologies. Examples of such technologies are WIFI, Bluetooth®, W-CDMA, GSM, UTRAN, LTE, NMT to name a few.

The terminal 100 may further comprise a wired interface 235, which is adapted to allow the terminal to communicate with other devices through the use of different network technologies. Examples of such technologies are USB, Ethernet, Local Area Network, TCP/IP (Transport Control Protocol/Internet Protocol) to name a few.

The controller 210 is configured to operably execute applications 250 such as the web browsing or email application through the RF interface 230 and/or the wired interface 235 using software stored in the memory 240 which software includes various modules, protocol stacks, drivers, etc. to provide communication services (such as transport, network and connectivity) for the RF interface 230 and the wired interface 235, and optionally a Bluetooth interface and/or an IrDA interface for local connectivity. The RF interface 230 comprises an internal or external antenna as well as appropriate radio circuitry for establishing and maintaining a wireless link to a base station. As is well known to a person skilled in the art, the radio circuitry comprises a series of analogue and digital electronic components, together forming a radio receiver and transmitter. These components include, i.e., band pass filters, amplifiers, mixers, local oscillators, low pass filters, AD/DA converters, etc.

Figure 3:
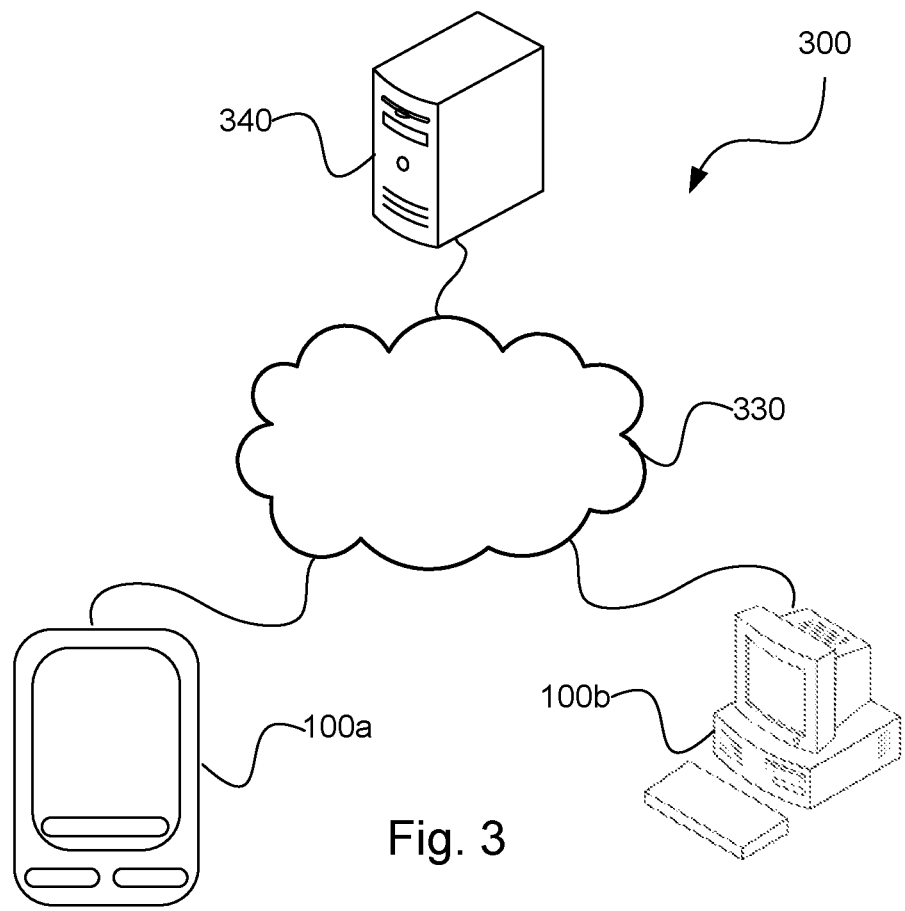
FIG. 3 is a schematic view of a general view of a computer network according to the teachings herein.

FIG. 3 shows a schematic overview of a computer network 300 according to an embodiment herein. Two terminals 100a, 100b, such as the terminals 100 of FIG. 1 or 2, are connected through a network or other connection 330 in one example via the internet. The two terminals may be connected through a wired connection or a wireless connection or any combination of known connection methods for example through dedicated networks or connections. In FIG. 3 there are two terminals 100a and 100b, of which one is a desktop computer 100a and the other is a smartphone 100b. It should be noted that any terminal may be connected to the internet and the number and type of terminals 100 in FIG. 3 should not be construed as limiting. The computer network 300 further comprises at least one server 340. In FIG. 3 only one server 340 is shown, but it should be noted that any number of servers 340 may be implemented in a computer network 300. Generally a server is a physical computer (a hardware system) dedicated to running one or more services (as a host), to serve the needs of users of the other computers or terminals 100a, 100b on the network 300. Depending on the computing service that it offers it could be a database server, file server, mail server, print server, web server, or other.

In one embodiment the server 340 is a web server 340. Generally, a web server 340 can refer to either hardware (a computer) or software (a computer application) that helps to deliver content that can be accessed through a mutual communication network, such as the Internet 330.

The Internet 330 is a global system of interconnected computer networks that use the standard Internet protocol suite (TCP/IP—Transmission Control protocol/Internet Protocol) to serve billions of users worldwide. It is a network of networks that consists of millions of private, public, academic, business, and government networks, of local to global scope, that are linked by a broad array of electronic, wireless and optical networking technologies. The Internet carries a vast range of information resources and services, such as the inter-linked hypertext documents of the World Wide Web (WWW).

As would be apparent to a skilled reader, the internet is full of possibilities and variations of how to connect two terminals and the embodiments disclosed herein are for purely exemplary purposes and should not be construed to be limiting.

Even if the disclosure herein is focused on communications networks between terminals and a server, the teachings herein may also be used within an apparatus 300 for establishing a secure connection between two devices, such as an external memory being connected to a personal computer. With reference to FIG. 3 a first device 100*a* is then to be connected to a second device 100*b*. The communication is to be established over a data bus or other internal communication network, as is known to a skilled person. A server application running in one (or both) of the devices 100*a* and 100*b* or alternatively in another device not shown such as a controller of the apparatus 30 corresponds to the server 340 of FIG. 3. With reference to FIG. 2, such an apparatus 300 may be conceived as a terminal 100 to which an external device 245 is to be connected to. The establishment of a secure communication channel as per the teachings herein may then be effected by the controller, serving as a server possibly through a server application being executed by the controller 210, or by another drive controller. Possibly the server is an external security server which is contacted though a wired or wireless communication channel to handle the establishment of the communication exchanging addresses for the local bus or other intra-device communication hardware.

It should be noted that an external device in this context may in one embodiment be understood to be a device to be connected to a terminal. It may thereafter be a more or less permanent component of, and possibly also internal to, the terminal 100.

Figure 4:
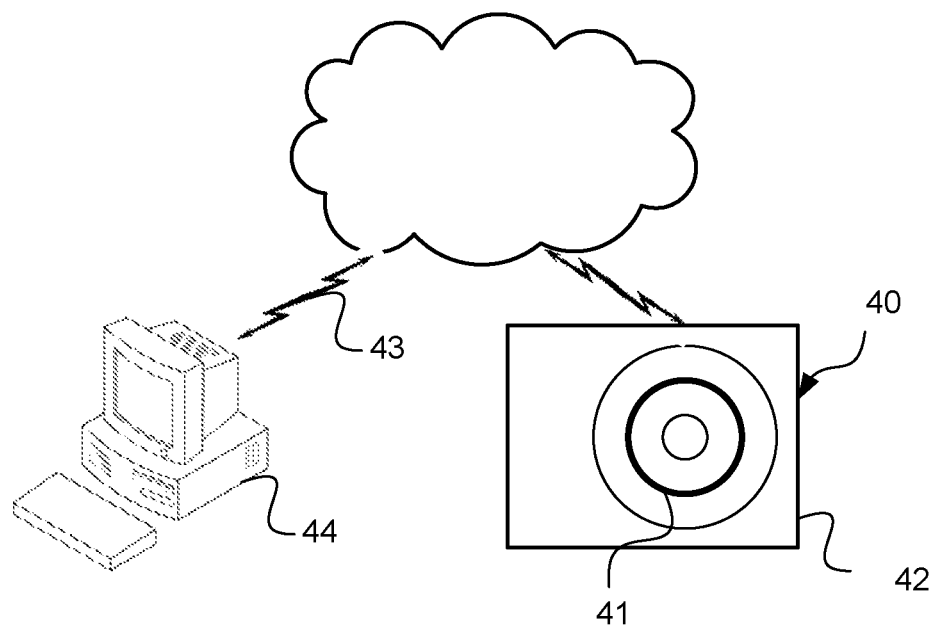
FIG. 4 shows a schematic view of a computer-readable medium according to one embodiment of the teachings of this application.

FIG. 4 shows a schematic view of a computer-readable medium as described in the above. The computer-readable medium 40 is in this embodiment a data disc 40. In one embodiment the data disc 40 is a magnetic data storage disc. The data disc 40 is configured to carry instructions 41 that when loaded into a controller, such as a processor, executes a method or procedure according to the embodiments disclosed above. The data disc 40 is arranged to be connected to or within and read by a reading device 42, for loading the instructions into the controller. One such example of a reading device 42 in combination with one (or several) data disc(s) 40 is a hard drive. It should be noted that the computer-readable medium can also be other mediums such as compact discs, digital video discs, flash memories or other memory technologies commonly used. In such an embodiment the data disc 40 is one type of a tangible computer-readable medium 40.

The instructions 41 may also be downloaded to a computer data reading device 44, such as a computer or other device capable of reading computer coded data on a computer-readable medium, by comprising the instructions 41 in a computer-readable signal 43 which is transmitted via a wireless (or wired) interface (for example via the Internet) to the computer data reading device 44 for loading the instructions 41 into a controller. In such an embodiment the computer-readable signal 43 is one type of a non-tangible computer-readable medium 40.

The instructions may be stored in a memory (not shown explicitly in FIG. 4, but referenced 240 in FIG. 2) of the computer 44.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 5:
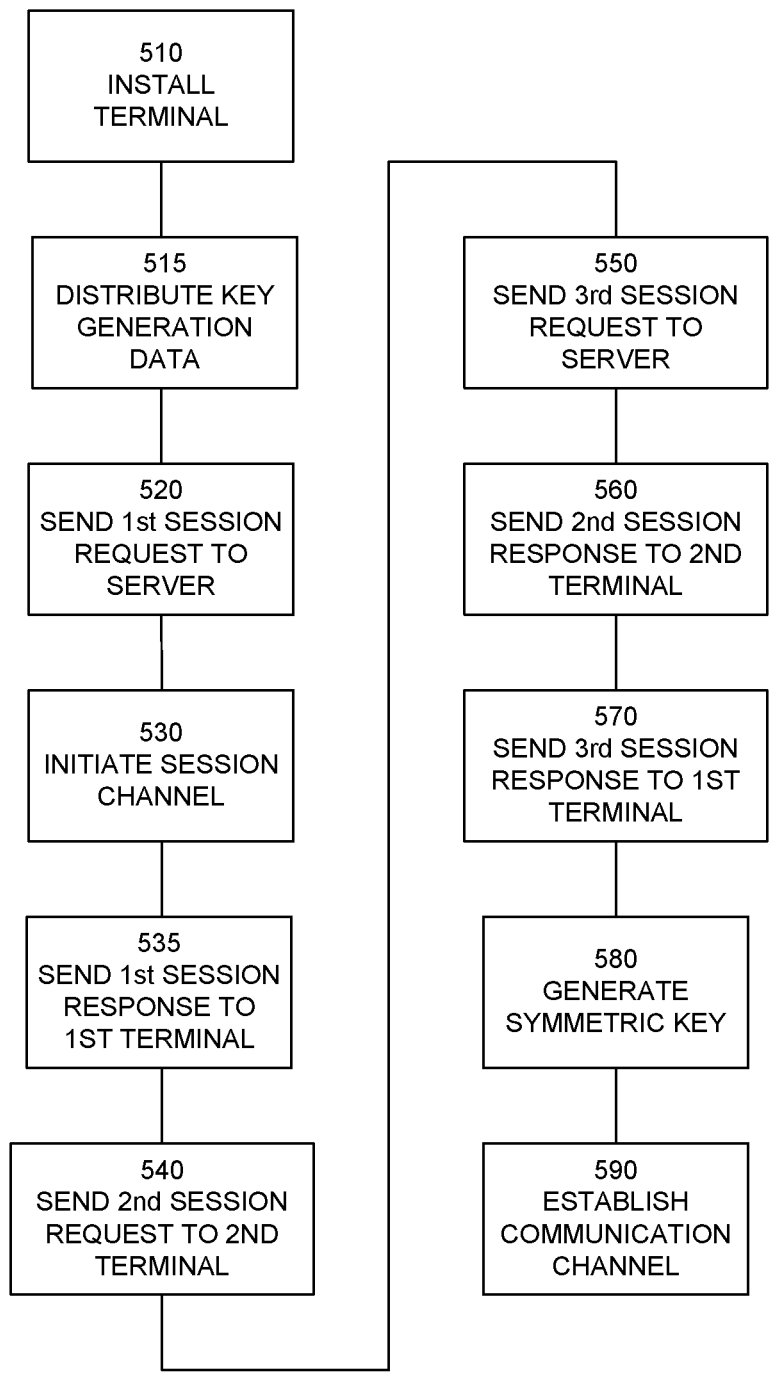
FIG. 5 shows a flowchart for a method according to the teachings herein for establishing a communication channel between a first terminal and a second terminal in a system.

The inventors have realized that a manner similar to that of WO 2011/002412 may be used also in systems using security measures such as firewalls, if the manner is modified in a clever and insightful manner. FIG. 5 shows an overview of such a manner for establishing a mutually secure connection between two terminals.

FIG. 5 shows a flowchart for a method according to the teachings herein for establishing a communication channel between a first terminal 100*a* and a second terminal 100*b* in a system 300 as in FIG. 3.

Before a connection is to be established a terminal, such as either the first terminal 100*a* and/or the second terminal 100*b* of FIG. 3, is installed or initiated 510 in the communication network 300 for the relevant application. Such an application may be a banking application, a secure communication application, or any other application requiring that both parties in a communication are identified. In one embodiment, such an application is when one device is to be connected to another device of an apparatus.

The installation is performed by a terminal 100 sending a request to be installed to a server 340. The server 340 responds by sending back information or data regarding key generation to the terminal 100 which receives the key generation data. Such key generation data is thereby distributed 515.

More details regarding the installation of a terminal 100 into the system 300 will be given with reference to FIG. 6.

When a first terminal 100*a* has been installed, it may want to set up a secure communication with another terminal 100*b*.

In one example embodiment, where the overall application is a banking application, the first terminal 100*a* represents the client and the second terminal 100*b* represents the bank. The server 340 may be hosted by a mutual bank cooperation, the bank itself or a secure connections provider.

In order to setup such a secure connection, the first terminal 100*a* initiates the setup by sending a first session request 520 to the server 340. The first session request includes an identifier for the second terminal 100*b* with which the first terminal wants to setup a communication with. The identifier for the channel data may in one embodiment be an address (such as a uniform resource locator address (URL) or Internet Protocol (IP) address) to an internet protocol communication channel.

The server 340 initiates or establishes a session channel 530 and responds with a first session response 535 indicating an identifier for the session channel and key data for the second terminal 100*b*, which is received by the first terminal 100*a*. The first terminal 100*a* then sends a second session request to the second terminal 100*b*. The second session request includes the identity of the first terminal 100*a* and a key encryption seed for the first terminal 100*a*.

As the second terminal 100*b* receives the second session request from the first terminal 100*a*, the second terminal 100*b* sends a third session request 550 to the server 340. The third session request includes an identifier for the first terminal 100a and/or an identifier for the current session. The server 340 determines whether the first terminal 100a is allowed to connect with the second terminal 100b and if so sends a second session response 560 to the second terminal 100b, wherein the second session response includes the identifier for the session channel and also data regarding key creation for the first terminal 100a.

As the second terminal 100b receives the second session response, the second terminal 100b may be sure that the first terminal is allowed to establish a connection with the second terminal 100b. The second terminal 100b thereafter sends a third session response 570 to the first terminal 100a, which third session response includes key data and a key encryption seed for terminal 100b.

The second terminal 100b and the first terminal 100a thus both have received key data from the server 340 as well as each other's key encryption seed. Based on this, the first terminal and the second terminal generate 580 a symmetric encryption key for encrypting data to be sent on the initiated session channel and a channel is thereby established 590.

Figure 12:
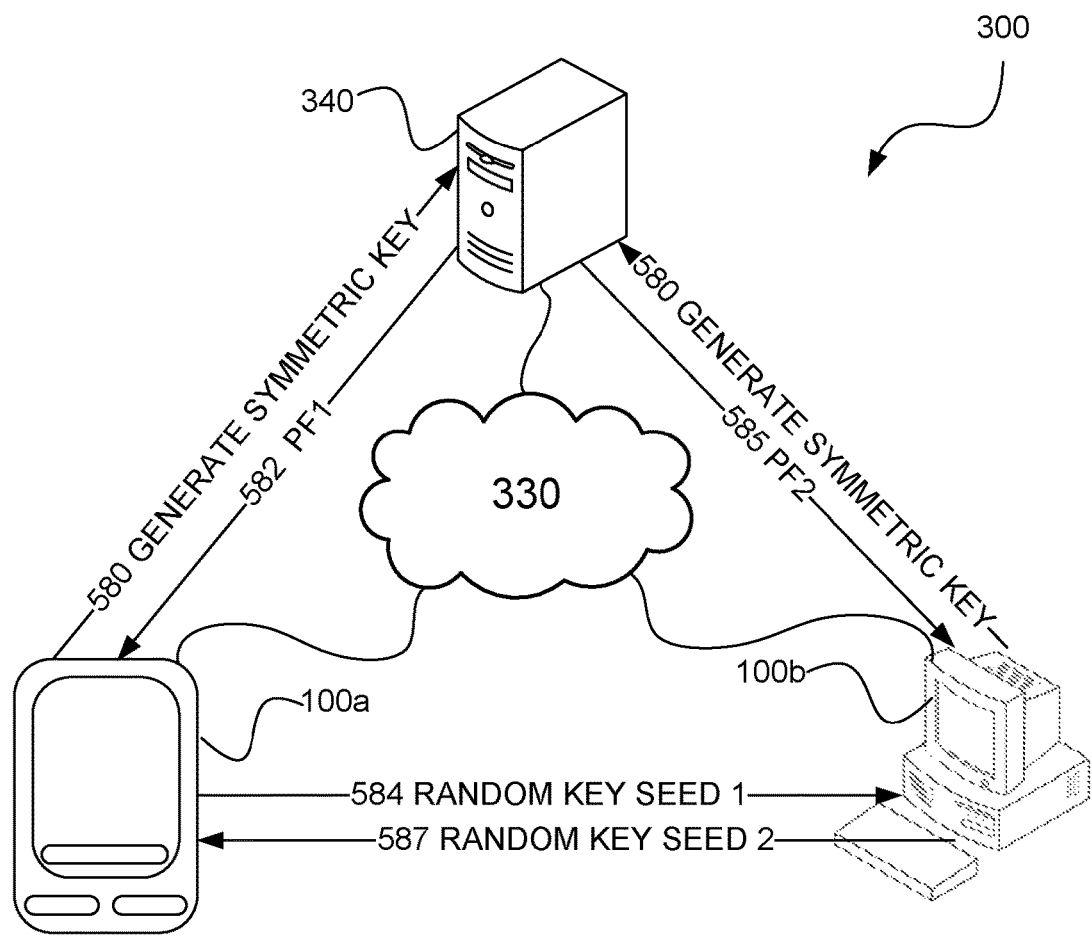
FIG. 12 is a schematic overview of the transmissions being done during the generation of a symmetric encryption key according to the teachings herein.

More details on how the symmetric encryption key is generated is given with reference to FIGS. 12, 13 and 14.

One alternative manner of generating such a symmetric encryption key is to be found in the teachings of WO 2011/002412.

In this manner, both the first terminal 100a and the second terminal 100b can be sure of the other terminal's identity and credibility as both terminals have been authenticated by the server 340. The terminals are also enabled to generate a symmetric encryption key without having to exchange complete keys with one another and without having to exchange a complete key, such as the symmetric key, with the server 340.

Furthermore, the server is authenticated by both terminals 100a and 100b. In prior art examples, it is only the server that authenticates the terminals, not the other way around as per the teachings herein.

Figure 6:
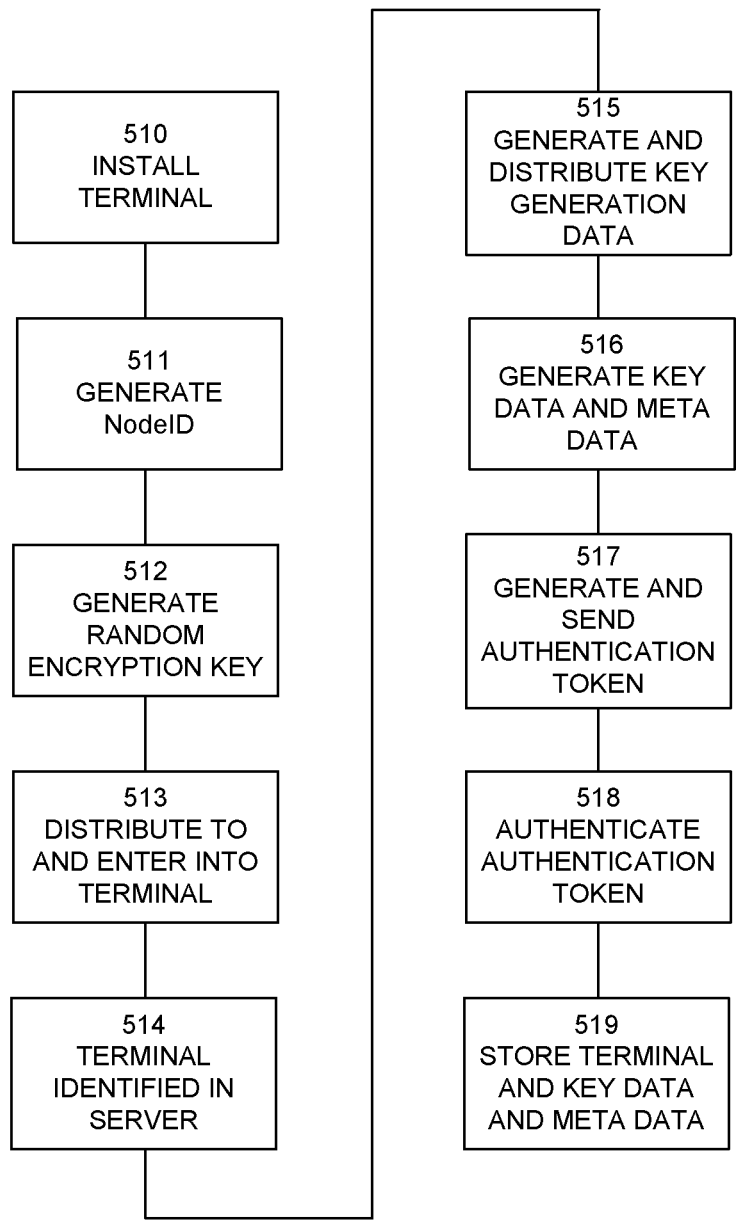
FIG. 6 shows a flowchart for a method according to the teachings herein for installing a terminal in a system.
Figure 7:
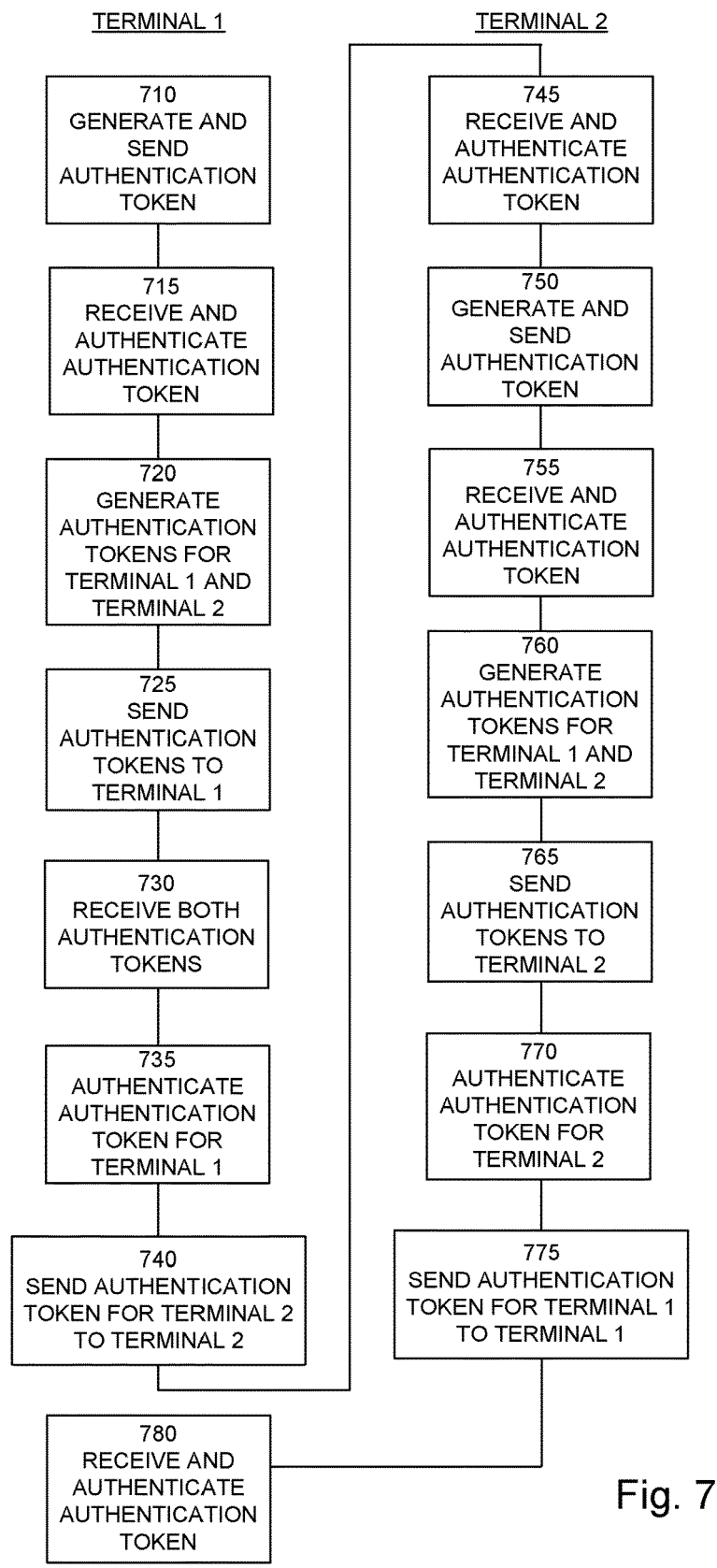
FIG. 7 is a flowchart of a general method for mutual authentication of a terminal and a server according to the teachings herein.

More details on such mutual authentication are given with reference to FIGS. 6 and 7 under Mutual Authentication.

Note that the whole setup of the secure communication channel is performed by active prompts from a terminal to which a response is provided thus enabling the communication systems setup to be used in systems employing security measures such as a firewall.

Installation of a Terminal

In order to ensure that a terminal that is to be installed in the system 300 is to be trusted and in order to ensure that any installation data transmitted between the terminal and the server can not be misused by a third party, the authors of this application have designed a manner for a secure installation where the key data is not sent in full thereby making it useless to any third party intercepting the communication. FIG. 6 shows a flowchart for a general method according to the teachings herein for installing a terminal 100 in a system 300 as in FIG. 3.

As a terminal 100 is to be installed in the system, such as when installing a terminal referenced 510 in FIG. 5, the server sets up an account for the terminal 100 by generating a random identification number, NodeID, 511 and a random encryption key, referenced Y, 512.

The random identification number and the random encryption key is then distributed in a safe manner to the terminal 100 to be installed. They may be distributed by regular mail, by email, by text message (such as short message service (SMS) messaging, or other secure channel.

The random identification number and the random encryption key are entered 513 into the terminal 100, possibly by a user, or by (another) secure application, where they are checked to see if they are correct, possibly through the use of a checksum being part of the random identification number and the random encryption key.

The terminal 100 then identifies 514 itself to the server 300 through the random identifier, NodeID, and is thus identified by the server 340. The server then generates two random encryption key seeds, a key data seed and a metadata seed, commonly referred to as a data seed.

The key data seed may be of a length of for example 128 or 256 bits. The metadata seed may be of a length of for example 128 or 256 bits.

Using these seeds, the server generates key data and metadata. The key data is the data that is used to generate the symmetric encryption key and the metadata is used together with or without the key data to generate an authentication token, which is to be described further below.

The key data may be of a length of 128, 256, 512 or 1024 bits. The metadata may be of a length of 8192 bits.

To safeguard against eavesdropping the server 340 only distributes 515 the key generating seeds to the terminal 100, that is, only the key data seed and the meta data seed are distributed to the terminal 100. This ensures that the actual key data and the meta data are kept secret in the server 340.

The key data and the meta data are encrypted using the random encryption key before being distributed to the terminal 100. And the terminal 100 decrypts the key data and the meta data using the random encryption key.

The terminal 100 then generates the key data and the metadata by using the same function as the server 340 used. The function may be distributed along with the random identifier and the random encryption key, or it may be distributed separately, wherein the random identifier and/or the random encryption key are parameters of the function, and/or the function may be implemented in the terminal and/or server. In one embodiment the function is a cryptographic hash function, such as a Feistel network.

Several functions for generating numbers are known and will not be discussed in further detail herein. The only feature of importance to the function is that it is the same function that is used by the terminal 100 as by the server 340.

The seeds are as such much smaller than the corresponding data to be generated and the server 340 only needs to transmit the smaller seeds to the terminal which saves bandwidth and also increases security as the seeds are worthless without the function.

The key data and the metadata are therefore generated 516 by both the server 340 and the terminal 100.

An authentication token is generated 517 by the terminal 100 based on the key data and/or the meta data and the authentication token is sent to the server 340 which authenticates 518 the authentication token, the server having access to the key data and the metadata on which the authentication token is based.

More details on how an authentication token is generated and also authenticated will be given below with reference to FIGS. 10A and 10B.

If the authentication token is authenticated, an identity for the terminal 100, such as an identification, is stored in the server 340. In one embodiment, the identification for the terminal 100 is the NodeID. In one embodiment, the identification for the terminal 100 is the IMSI (International Mobile Subscriber Identity), IMEI (International mobile Equipment Identifier) and/or serial number(s) of the terminal

100. In one embodiment, the identification for the terminal 100 is an application identifier provided with an application utilizing the secure communication channels as taught by the teachings herein.

For the embodiment where a terminal is an external device, the NodeID for the external device may be supplied along with the external device or be sent to a user or to the external device upon registration of the external device 245.

Mutual Authentication

As a terminal 100*a* has been installed and attempts to set up a communication channel with a second terminal 100*b*, such as a bank application server, where the communication channel is administered by a security server 340, possibly being part of or implemented in the same bank server, the terminal 100*a* is to be authenticated by the authenticated by the security server 340, hereafter and as above referred to as the server 340. After the terminal 100*a* is authenticated by the server 340 it is provided with key data necessary for establishing the secure communication with the second terminal 100*b*.

However, in today's society many scams are run over the internet, which is the reason for the secure communication channel. However, the inventors have realized that there is an underlying problem inherent to all such secure communication systems in that using today's advanced technology neither the first terminal 100*a* (nor the second terminal 100*b*) can be sure that the server 340 is actually to be trusted. The address of the server 340 may actually have been hijacked by a malicious scam operator who may provide key data leading to an encryption which the scam operator may then be able decrypt.

Realizing that this problem exists and through insightful reasoning and inventive thinking, the inventors of this application have designed a manner where also the server 340 is authenticated.

For the embodiment of installing an external device 245 in an apparatus 300, such as a terminal 100, such an authentication serves to protect that sensitive data is not read by another device being part of or later connected to the apparatus 300 or by a replaced operating software. Therefore mutual authentication serves to protect from gaining access to a protected device simply by replacing some components (memory carrying software code) or other devices.

Figure 8:
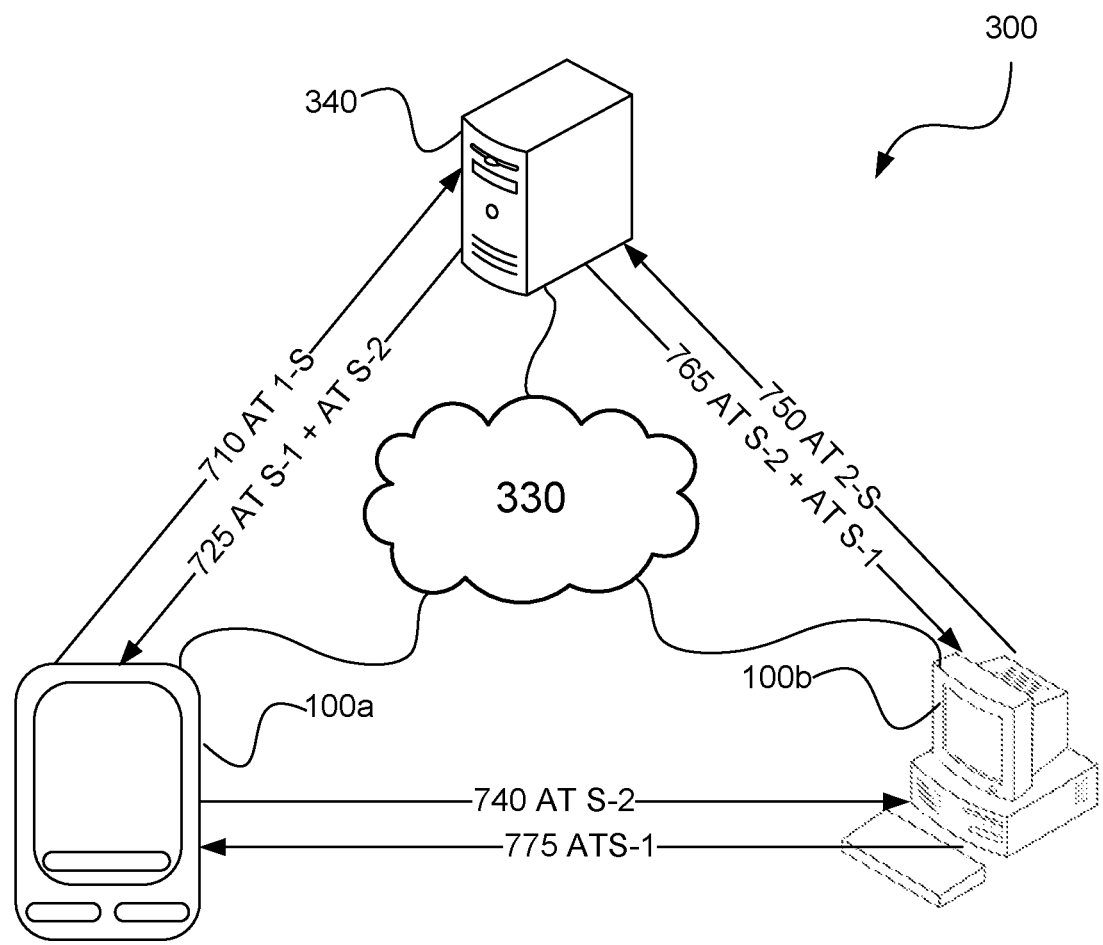
FIG. 8 is a schematic overview of the authentication transmissions being done during a mutual authentication according to the teachings herein.

FIG. 7 is a flowchart of a general method for mutual authentication of a terminal 100 and a server 340 according to the teachings herein and FIG. 8 is a schematic overview of the authentication transmissions being done during such a mutual authentication. A detailed description of such authentication will be given with simultaneous reference to FIGS. 7 and 8 in the below.

The first terminal 100*a* initiates the authentication by generating an authentication token AT 1-S (reference indicating that it is an authentication token from terminal 1 to server S) and sending it 710 to the server 340 possibly along with a session request. Alternatively, the session request is sent after the authentication has been completed successfully. It should be noted that any of the terminals 100*a*, 100*b* may initiate the authentication. The server 340 may also initiate the authentication. The server may initiate the authentication by prompting the first terminal 100*a* (or the second) to provide an authentication token.

The server 340 receives the authentication token AT1 -S and authenticates it 715.

The authentication token may be an identifier (such as the NodeID) for the terminal, possibly encrypted with the previously received random encryption number, known only to the first terminal 100*a* and the server 340. The authentication token may also be another string or number known only to the server 340 and the terminal 100*a* possibly determined through a known protocol or algorithm, and may also be encrypted with the random encryption number. Being able to secure that the authentication is safe it is beneficial to use a large string as such are more difficult to guess. Such a string is the meta data which is known only to the server 340 and the terminal 100. A problem in this is that a large file has to be sent every time the authentication is to be made, and as will be disclosed in the below, the meta data would also be shared with the second terminal thereby leaking the meta data to the second terminal who should not have knowledge of the meta data for the first terminal 100*a*. However, using the meta data would be beneficial as it is a large string that is difficult to maliciously derive and is also known only to the server 340 and the terminal 100.

The inventors have thus designed a clever and simple manner of devising an authentication token from the meta data, wherein a plurality of chunks or portions is chosen at random from the meta data.

Authentication Token

FIG. 9 shows an example of a meta data string MTS and a corresponding authentication token AT. In the example of FIG. 9, the meta data string is comprised of only 40 characters, however it should be noted that the actual length of a meta data string MTS is preferably much longer. In one embodiment the length is 8192 bits. Furthermore, the number of portions used in this example is four and the length of each portion is 2, but in a real implementation the length of a portion should be 64-128 bits, and in one embodiment the portion length is 96 bits. It should be noted that the length of a portion may vary also within an authentication token, as may the number of portions. In an embodiment where the number of portions varies, a header to the authentication token may be used to indicate the number of portions. In an embodiment where the length of one or more portions vary, a header to the authentication token may be used to indicate the length of the portions or, each portion may be initiated by the length of the portion.

The four portions are referenced by indexes. The indexes may be chosen randomly or through a known function, such as a random number generator, e.g. using a seed. Examples of such a function have been given above in the disclosure of how a terminal is installed in a system.

In such an embodiment where a seed is used for a function to generate the indexes, only the seed may be necessary to transmit in the authentication token.

An index should have a length that is enough to adequately address the larger data set, i.e. the meta data string (MTS). For a meta data of 8192 bits, an index has to have a length of 13 bits. An index may also be given as a number of steps to the next portion, wherein the index length can be reduced by one bit assuming that the next portion is at least within the next half of the meta data.

The indexes or the seed may be given in a header of the authentication token. The indexes may also be given as a header to each portion. FIG. 9 shows three examples for such authentication tokens, where a seed is given in a header, four indexes are given in a header and where the four indexes are given as headers to each portion. In all three examples, the seed is 24, and the indexes are 3, 7, 13 and 16 and the corresponding portions are "as", "or", "lp" and "it" respectively.

It should be noted, as in the above, that the example indexes and portion lengths as well as the length of the metadata string MTS are made short to illustrate the teachings herein more easily.

By only sending portions of the meta data it is assured that a terminal 100 and a server 340 may be authenticated without wasting bandwidth and without divulging sensitive information as only portions of the meta data are transmitted.

An authentication token AT may then be authenticated by simply comparing the portions to corresponding portions in the meta data. The corresponding portions are retrieved through the indexes which are either received as part of the authentication token or retrieved as a function of the seed which is part of the authentication token.

The indexes may also be given based on a timed function, such as the time of day or a counter. The counter has to be incremented at a speed during which an authentication token may be generated, sent and received.

FIG. 10A shows a general flowchart for generating an authentication token according to the teachings herein and FIG. 10B shows a general flowchart for authenticating an authentication token according to the teachings herein.

An authentication token AT is generated by generating at least one index 1010. The number of indexes may vary within an implementation and also between implementations as has been discussed above. In one embodiment the number of indexes is 4.

The indexes may be generated as randomly chosen numbers, or through a randomly chosen seed being used with a function.

Thereafter at least one portion is retrieved 1020 from a larger data set, such as the meta data (MTS in FIG. 9) and packaged along with the indexes (or the seed) in a data structure 1030 such as shown in FIG. 9.

As an authentication token is received 1040, the indexes are retrieved 1050 (either from the authentication token or by using a function based on a seed) and the corresponding portion(s) are retrieved 1060 from a locally stored data set, such as the meta data. The corresponding portion(s) are then compared 1080 to the received portion(s) and if they match the authentication token is authenticated.

The comparison may be made bitwise or by any other known comparison. A bitwise comparison has the benefit that it is fast to execute.

If an index is chosen to be too close to an end of the data set so that there are not enough characters or bits left to complete a portion, further or missing characters or bits may be taken from the start of the data set, i.e. the data set is looped.

In the above no difference has been made between a data set containing characters and a data set containing bits. As would be understood by a skilled person such entities may easily be replaced within the scope of the teachings herein.

For a meta data set of 8192 bits and with four portions or chunks of each 96 bits an authentication token of 4×96+4× 13 (an index needs to be at least 13 bits to properly address 8192 bits)=436 bits. So not only is sending the authentication token alone safer than sending the meta data as the meta data is kept secret, the bandwidth needed is also reduced by approximately 95%.

In one embodiment, the index is chosen to e able to address more than the meta data and the corresponding portion can then easily be found by addressing the meta data at the index modula the metadata size. In the example of the meta data having 8192 bits, the address to retrieve a portion is thus to be found at the index modula 8192.

As is clear from the description above an authentication token may be generated and authenticated by both a terminal and a server. In fact, an authentication token may be generated by any computing device, the terminals of FIGS. 1 and 2 and the server of FIG. 3 being examples of such a computing device. An external device may also be such a computing device.

Returning to FIGS. 7 and 8 and the mutual authentication, as the server 340 has authenticated the authentication token AT 1 -S received from the first terminal 100a, the server generates 720 one authentication token AT S1 directed to the first terminal 100a and one authentication token AT S-2 directed to the second terminal 100b and sends 725 both authentication tokens AT S-1, AT S-2 to the first terminal 100a.

In one embodiment, the server 340 encrypts the authentication token AT -S2 directed for the second terminal 100b. The authentication token may be encrypted using a portion of the meta data for the second terminal 100b and in such an embodiment, the authentication token may be configured to comprise a further field indicating an encryption index which indicates where in the meta data the encryption key for encrypting the authentication token is to be found. The encryption index is therefore transmitted unencrypted. This prevents any malicious attacker posing as the second terminal 100b from decrypting the authentication token AT S2.

As the first terminal 100a receives 730 the two authentication tokens AT S1 and AT S-2, the first terminal 100a authenticates 735 the first authentication token AT S1 received from the server 340.

As the first terminal 100a does not have access to the second terminal's 100b meta data it cannot authenticate the second authentication token AT S-2 received from the server 340. However, by the server 340 sending an authentication token aimed at the second terminal 100b to the first terminal 100a, an additional authentication of the server 340 is achieved through the second terminal 100b.

If the authentication of the first authentication token AT S-1 received from the server 340 is successful, the first terminal 100b proceeds with the additional authentication which is effected by the second terminal 100b. To this end, the first terminal sends 740 the second authentication token AT S-2 received from the server 340 to the second terminal 100b. The second terminal 100b receives and authenticates 745 the authentication token AT S-2. If the authentication is successful, the server 340 has been authenticated through both the first terminal 100a and the second terminal 100b. A mutual authentication of a high degree of security has thus been achieved.

However, by realizing that if a malicious scam operator has been able to hijack a communication channel between the first terminal 100a and the server 340, the authentication token for the second terminal 2 could potentially also be compromised. In order to increase the security of the authentication even further, the second terminal 100b is advantageously configured to also authenticate the server 340.

As the second terminal 100b has authenticated the authentication token AT S2 received from the server 340 through the first terminal 100a and aimed for the second terminal 100b, the second terminal proceeds to authenticate the server 340 using its own communication channel to the server 340.

The second terminal therefore generates an authentication token AT 2 -S for the server 340 and sends 750 it to the server 340. The server 340 receives the authentication token AT 2 -S and authenticates it 755. If the authentication is successful, then the second terminal 100b is authenticated by the server 340 and the server 340 generates 760 one authentication token AT S-1 directed to the first terminal 100a and one authentication token AT S-2 directed to the second terminal 100b and sends 765 both authentication tokens AT S-1, AT S-2 to the second terminal 100b.

As the second terminal 100b receives 770 the two authentication tokens AT S-1 and AT S-2, the second terminal 100b authenticates the second authentication token AT S-2 received from the server 340, and if successful sends 775 the second authentication token AT S-1 to the first terminal 100a which authenticates 780 the authentication token AT S-1 aimed for it received from the server 340 through the second terminal 100b.

Not only is the server 340 thus authenticated by the first terminal 100a, but it is also authenticated on behalf of the first terminal 100a by the second terminal 100b. The two terminals thus assist each other in authenticating the server 340. Furthermore, the second terminal 100b is authenticated implicitly by the first terminal 100 through the authentication tokens received from the server 340 via the second terminal 100b. Also, the server 340 is authenticated using two different communication channels thereby making it very hard for a scam operator to maliciously identify itself as the security server 340.

Generation of a Symmetric Encryption Key

As the two terminals 100 and the server 340 have been authenticated, a symmetric encryption key is generated. With reference to FIG. 5, a terminal 100 receives 515 key generation data when it is installed and based on this generates 516 key data. The key data is to be used for generating a symmetric encryption key as will be disclosed below. The symmetric encryption key is to be used encrypting for communication between a first terminal 100a and a second terminal 100b. The first terminal 100a may be, as in the above, a client to a secure service, and the second terminal 100b may be the provider of the service.

Alternatively, the first terminal 100a may be an external device 245 to be connected to an apparatus 300, wherein the second terminal 100b represents the apparatus 300.

The key data generated is known only to the first terminal 100a and the server 340 and the second terminal 100b does not know of this key data. This enables for an increased security as the communication connection to be established is established without exchanging respective terminal's key data, thus making it difficult for a malicious scam operator to intercept any key data.

For this purpose, the inventors have devised a simple and clever manner of producing a symmetric encryption key from the respective terminal's key data without actually sharing the key data.

Figure 11:
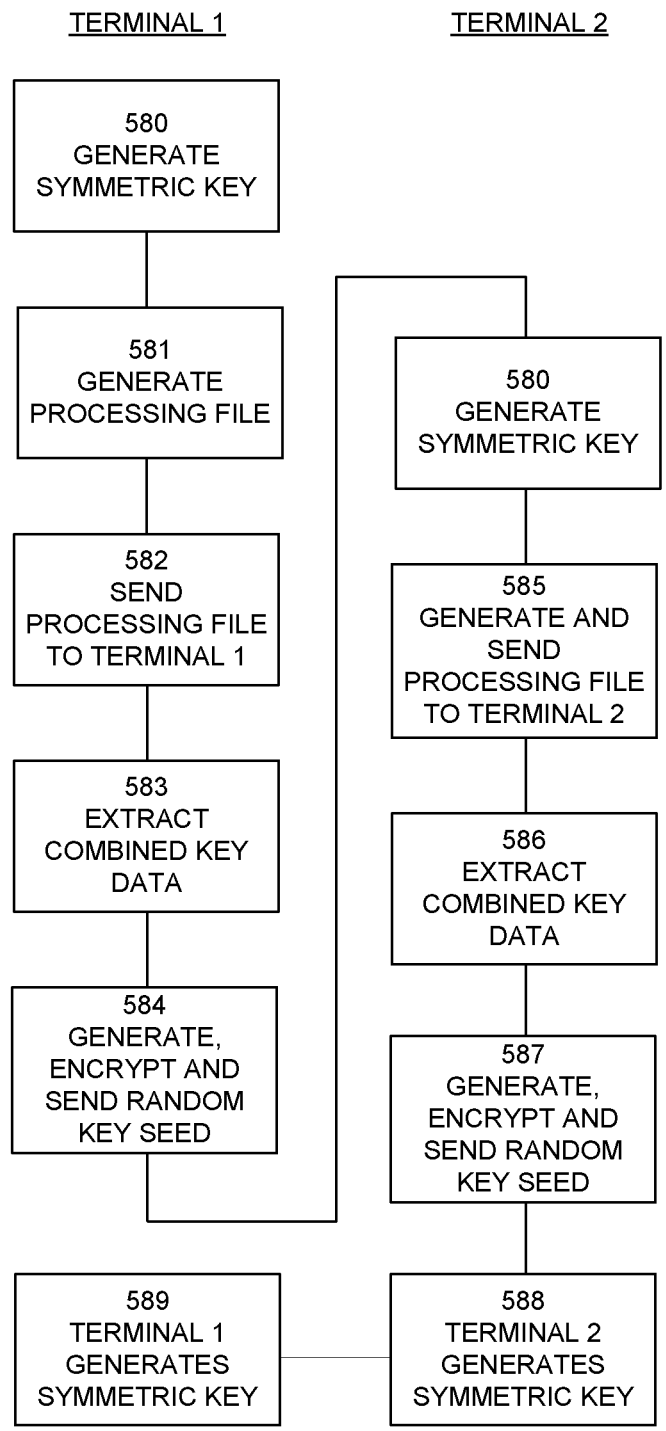
FIG. 11 shows a flowchart for a method of generating a symmetric encryption key according to the teachings herein.

FIG. 11 shows a flowchart for a method of generating such a symmetric encryption key and FIG. 12 is a schematic overview of the transmissions being done during the generation of a symmetric encryption key according to the teachings herein.

The first terminal 100a starts by sending a request for a symmetric encryption key to be generated 580. This request may be sent as part of a session setup request as per FIG. 5 or it may be sent on its own. The request may also be implicit in previous requests. The server 340 then proceeds with generating 581 a first processing file PF1, which is returned 582 to the first terminal 100a.

The first terminal 100a then extracts 583 a combined key data from the first processing file PF1. The first terminal 100a then generates a first random key seed which is encrypted and sent to the second terminal 584. The second terminal 100b also sends a request 580 for generating a symmetric encryption key to the server 340 and the server 340 generates and sends 585 a second processing file PF2 to the second terminal 100b.

The second terminal 100b then extracts 586 the combined key data from the second processing file PF2 and generates a second random key seed which is sent 587 to the first terminal 100a. Both the first and the second terminals 100 then generates the symmetric encryption key, each on their own 588, 589.

FIG. 13 is a flowchart for a general method according to herein for generating a processing file PF from the key data for two terminals. The key data for a first terminal will be referenced KD1 and the key data for a second terminal will be referenced KD2.

As a processing file is to be generated 581, a combined key data (referenced CKD) is generated 5811 as a bitwise AND operation on the key datas for each terminal, that is:

CKD=KD1 AND KD2.

The inverse of the key data for the relevant terminal is then generated 5812, I.E. ~KD is generated and subjected 5813 to a function F where each 1 bit is changed to a 0 bit with a probability of for example 10%, 25%, 50% or a probability in any of the ranges of 10-80%, 20-70% or 25-50%. The resultant changed bit string may be referenced as F(~KD). The processing file is then generated 5814 as the logical OR between the combined key data and the resultant changed bit string. That is:

PF1=CKD OR F(~KD1)=(KD1 AND KD2) OR F(~KD1), and

PF2=CKD OR F(~KD2)=(KD1 AND KD2) OR F(~KD2)

The generated processing file PF is thus completely different from the key data and also from the combined key data and as such, the respective key data are kept secret from the other terminal and both the combined key data and the respective key data are kept secret from the outside world.

As the processing file has been received, the combined key data is extracted (583/586 in FIG. 11) by simply performing the logical or bitwise AND of the processing file and the key data of the respective terminal, that is:

CKD=PF1 AND KD1 and

CKD=PF2 AND KD2.

In order to illustrate the above, an example is presented below. It should be noted that the example is restricted to 8 bits for illustrative purposes, whereas in a real life implementation longer strings should be used, for example 128 bits, 256, 512, 1024 bits as more bits provides for a higher security.

EXAMPLE

| | |
|---|---|
| KD1 | 10001110 |
| KD2 | 01111101 |
| CKD = KD1 AND KD2 | 00001100 |
| ~KD1 | 01110001 |
| F(~KD1) | 01010000 |
| PF1 = CKD OR F(~KD1) | 01011100 |

Extraction

| | |
|---|---|
| CKD = PF1 AND KD1 | 00001100 |

As the combined key data has been extracted, while maintaining it securely hidden in the processing file during transmission, the symmetric encryption key is to be generated. FIG. 14 is a flowchart of an example manner for generating the symmetric encryption key according to the teachings herein.

The symmetric encryption key is finally generated 588/589 by both terminals 100, by inputting the combined key data and a random key seed previously generated (584 for the first terminal and 587 for the second terminal) for each terminal as seeds in a function such as a cryptographic hash function or an exclusive or function (XOR) 5801 for each terminal 100. In one embodiment, the function is to repeat the random key seed 8 times to become an extended random key seed of for example 512 bits and perform an exclusive OR function on the combined key data and the extended random key seed. The half Symmetric Key is created as 128 bits taken from the XORed value possibly using a modulo function. This step is performed by both terminals 100 having received the other terminal's random key seed previously. In one embodiment, the result is a bit string of for example 128 bits for each terminal and the two bits strings are concatenated 5802 into the thereby generated symmetric encryption key.

The symmetric encryption key is the result of the session setup and is to be used during the communication between the first terminal 100a and the second terminal 100b for encoding and decoding the communication.

It should be noted that even though the flows for the mutual authentications and for generating the symmetric encryption keys have been disclosed as separate flows they may be parts of the same flow and data to be sent in transmissions in either flow may be combined into a common transmission to reduce bandwidth and also parallelise the authentication flow.

Mutation of the Key Data

To protect against malicious attacker trying to hijack key data or other encryption data, a simple solution of mutating or changing the key data is proposed by the inventors of this application. It should be noted that the meta data, the key data and the symmetric encryption key may all be mutated individually or collectively.

In one embodiment, the meta data is mutated once a day as it is mainly used for authentication purposes.

In one embodiment, the key data is mutated at every session setup or at intervals or upon prompts from the first terminal during a session.

In one embodiment, the symmetric encryption key is mutated at intervals or upon prompts from the first terminal during a session.

One way to mutate the symmetric encryption key is to set up a new session. During the session setup the key data will be mutated and hence also the symmetric encryption key. However, this consumes both computer resources and time to perform a complete session setup. A faster way is to only mutate the symmetric encryption key. This is only done at the terminals; the server is not involved.

It is up to the secure application to decide when the mutation is to be done. In a chat application, for instance, it might be appropriate to mutate the symmetric encryption key for each message that is sent to the other terminal. In an application that is time critical it might be better to perform the mutation at, for instance, every tenth package, or not at all.

It is up to the initiating terminal (sender) to control whether a new package should have a mutated Symmetric Encryption Key or not. This is done by adding a version number, the Symmetric Encryption Key Version, to each communication package. If the initiating terminal wants to use this feature then it must increase the variable for each package that is sent.

The Symmetric Encryption Key Version is initially set to 0 at server setup. If the sender never changes this value no mutation will take place. If the sender, on the other hand, for instance uses the values 3, 7, 13, 14 in the first four packages then the responding terminal needs to mutate 3, 4, 6, 1 times for the respective package.

The receiving first terminal always checks the version number of each communication package it receives. If it has been changed then the receiving terminal has to mutate the Symmetric Encryption Key accordingly before decrypting the message. If the value is larger than the previous package then it just mutates the appropriate number of times. If it is smaller, then it must use the Symmetric Encryption Key with Symmetric Encryption Key Version=0 and start all over again.

The mutation of the Symmetric Encryption Key may be done using the 512 bit cryptographic hash function using the current Symmetric Encryption Key as input.

Overview of the System

Figure 15:
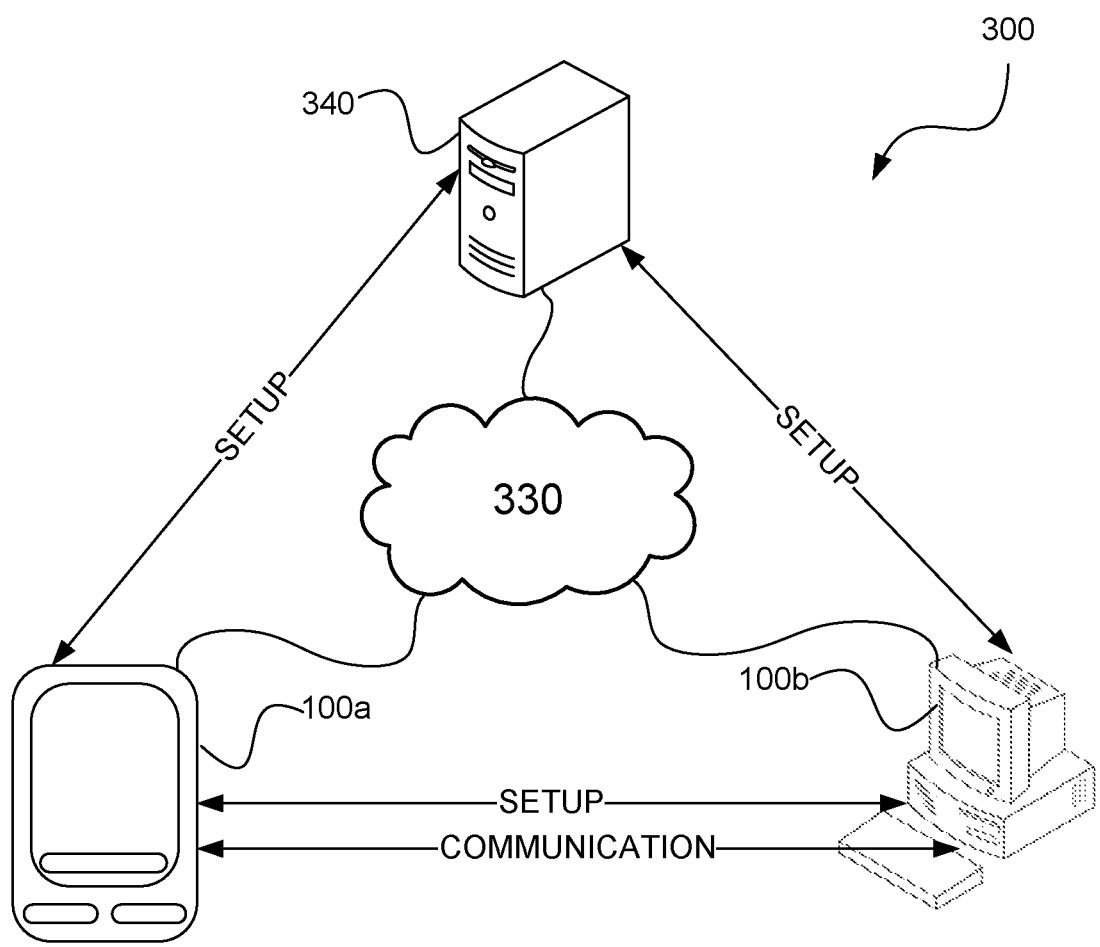
FIG. 15 shows a schematic overview of the system communication according to the teachings herein.

FIG. 15 shows a schematic overview of the system communication according to the teachings herein. The system 300 shown in FIG. 15 may be a system 300 or apparatus 300 as described above.

The first terminal 100a initiates the setup with the server 340 and the second terminal 100b, which is a responding terminal, as has been disclosed above with reference to FIGS. 5, 6, 7, 8, 9, 10A, 10B, 11, 12, 13 and 14.

As the symmetric encryption key has been generated the first terminal 100a and the second terminal 100b can communicate securely over the communication channel established.

One benefit of the teachings herein is that a symmetric encryption key may be generated by both communicating terminals without having to share it between the terminals or other devices.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A system for authenticating, comprising:
a first computing device, a second computing device and a server;
wherein the first computing device is configured to perform:
generating a first authentication token (AT), the first authentication token (AT) being a data structure to be used for authenticating the first computing device to the second computing device, and sending the first authentication token (AT) to the server;
wherein the server is configured to perform:
receiving and authenticating the first authentication token (AT), and
generating a second authentication token for the first computing device and sending the second authentication token (AT) to the first computing device;
wherein the first computing device is configured to perform:
receiving and authenticating the second authentication token (AT), thereby performing a mutual authentication of the first computing device and the server;
wherein the server is further configured to perform:

generating a third authentication token (AT) for the second computing device and sending the third authentication token to the first computing device;
wherein the first computing device is further configured to perform:
receiving the third authentication token (AT) and sending it to the second computing device;
wherein the second computing device is configured to perform:
receiving and authenticating the third authentication token (AT) thereby performing an authentication of the server and the first computing device;
wherein the second computing device is configured to further authenticate the server by:
generating a fourth authentication token (AT), and sending the fourth authentication token to the server;
wherein the server is further configured to perform:
receiving and authenticating the fourth authentication token (AT), and
generating a fifth authentication token for the second computing device; and sending the fifth authentication token (AT) to the second computing device; and
wherein the second computing device is configured to perform:
receiving and authenticating the fifth authentication token (AT), thereby performing a mutual authentication of the second computing device and the server.

2. The system according to claim 1, wherein the server is further configured to generate the third authentication token (AT) for the second computing device and send the third authentication token to the first computing device along with the second authentication token (AT).

3. The system according to claim 1, wherein the server is further configured to generate a sixth authentication token (AT) for the first computing device and send the sixth authentication token (AT) to the second computing device, wherein the second computing device is further configured to perform receiving the sixth authentication token (AT) and sending the sixth authentication token (AT) to the first computing device, wherein the first computing device is configured to perform receiving and authenticating the sixth authentication token (AT) thereby performing an authentication of the server and the second computing device.

4. The system according to claim 3, wherein the server is further configured to generate the sixth authentication token (AT) for the first computing device and send the sixth authentication token (AT) to the second computing device along with the fifth authentication token (AT).

5. The system according to claim 1, wherein the system is an apparatus and the first computing device is an external device constructed to be installed in the apparatus and the apparatus is configured to execute the server or communicate with the server.

6. An authentication method, comprising the steps of:
generating, by a first computing device, a first authentication token (AT), being a data structure to be used for authenticating the first computing device to a second computing device; and
sending, by the first computing device, the first authentication token (AT) to a server;
receiving and authenticating, by the server, the first authentication token (AT);
generating, by the server, a second authentication token for the first computing device;
sending, by the server, the second authentication token (AT) to the first computing device;
receiving and authenticating, by the first computing device, the second authentication token (AT), thereby performing a mutual authentication of the first computing device and the server;
generating, by the server, a third authentication token (AT) for the second computing device and sending, by the server, the third authentication token (AT) to the first computing device;
receiving, by the first computing device, the third authentication token (AT) and sending, by the first computing device, the third authentication token (AT) to the second computing device; and
receiving and authenticating, by the second computing device, the third authentication token (AT) thereby performing an authentication of the server on behalf of the first computing device;
generating, by the second computing device, a fourth authentication token (AT) and sending, by the second computing device, the fourth authentication token to the server;
receiving and authenticating, by the server, the fourth authentication token (AT);
generating, by the server, a fifth authentication token for the second computing device and sending, by the server, the fifth authentication token (AT) to the second computing device, and
receiving and authenticating, by the second computing device, the fifth authentication token (AT), thereby performing a mutual authentication of the second computing device and the server.

7. A non-transitory computer readable storage medium encoded with instructions that, when executed on one or more processors, causes the one or more processors to perform the method according to claim 6.

* * * * *